Figure 1:
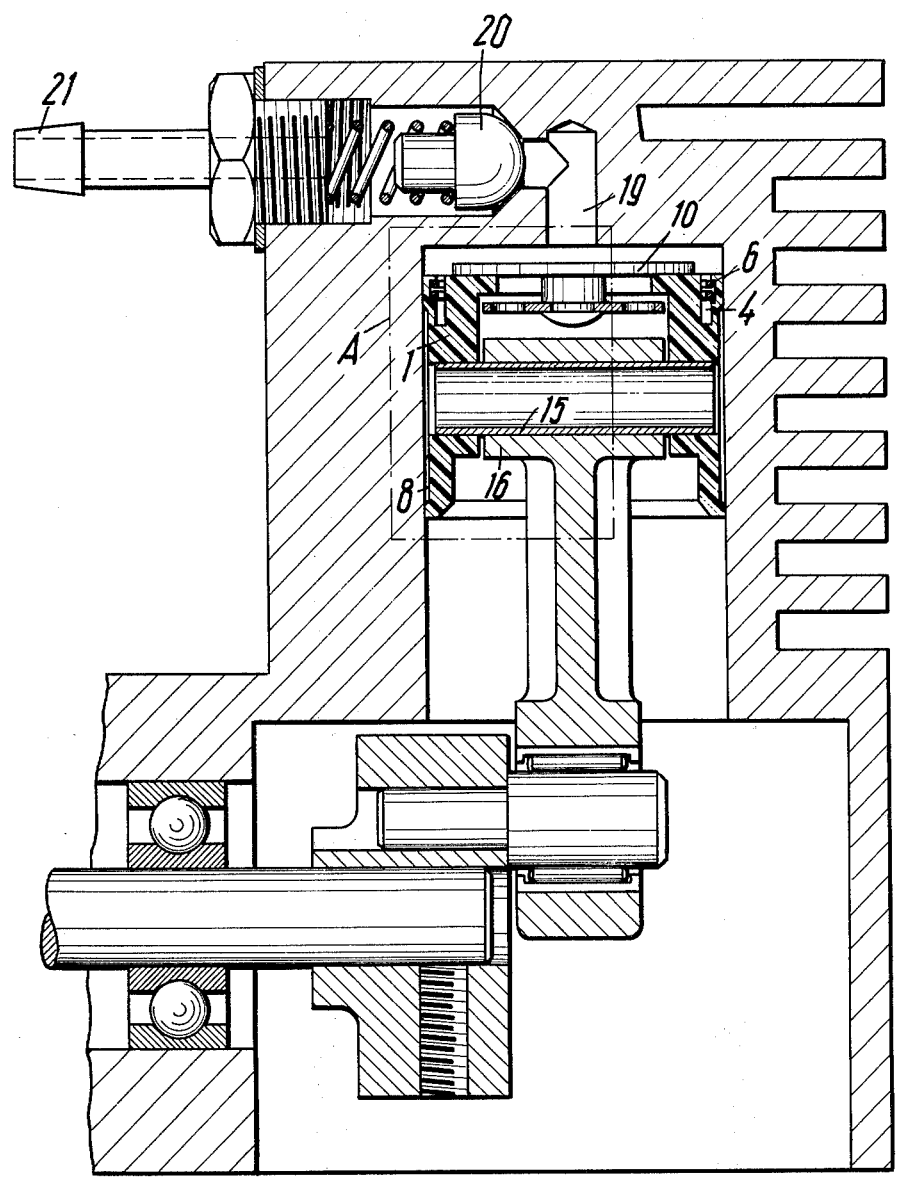

United States Patent [19]

Thurner

[11] 4,023,467

[45] May 17, 1977

[54] PISTON COMPRESSOR FOR GASEOUS FLUIDS

[75] Inventor: Helmut Thurner, Schwaberwegen, Germany

[73] Assignee: Bayerisches Druckgusswerk Thurner KG, Markt Schwaben, Germany

[22] Filed: Oct. 9, 1975

[21] Appl. No.: 621,020

Related U.S. Application Data

[62] Division of Ser. No. 433,812, Jan. 16, 1974, abandoned.

[30] Foreign Application Priority Data

Mar. 6, 1973  Germany ............................ 2311048

[52] U.S. Cl. .............................. 91/422; 92/181 P; 92/187; 92/194; 92/240; 417/552

[51] Int. Cl.² .................. F04B 21/04; F15B 13/04; F16J 9/08

[58] Field of Search ............ 92/194, 249, 240, 243, 92/181, 187; 91/422, 222; 417/552

[56] References Cited

UNITED STATES PATENTS

| | | | |
|---|---|---|---|
| 714,097 | 11/1902 | Caille | 417/552 X |
| 734,277 | 7/1903 | Niemeyer | 417/552 |
| 2,106,829 | 2/1938 | Christenson | 92/194 X |
| 2,449,740 | 9/1948 | Felser, Jr. | 417/552 X |
| 2,516,811 | 7/1950 | Thomas | 92/194 |
| 2,992,052 | 7/1961 | DeJohn | 92/194 X |
| 3,125,004 | 3/1964 | White | 92/249 X |
| 3,182,568 | 5/1965 | Davis | 92/194 |
| 3,229,855 | 1/1966 | Eggert, Jr. | 92/194 X |
| 3,295,419 | 1/1967 | Vielmo et al. | 92/194 X |
| 3,295,453 | 1/1967 | Scott | 417/552 X |
| 3,375,972 | 4/1968 | Raufeisen | 92/240 X |
| 3,388,638 | 6/1968 | Brinkel | 92/240 |

FOREIGN PATENTS OR APPLICATIONS

| | | | |
|---|---|---|---|
| 509,458 | 3/1962 | Belgium | 92/243 |
| 569,912 | 11/1967 | Italy | 92/240 |
| 2,258 | 8/1870 | United Kingdom | 417/552 |

*Primary Examiner*—Irwin C. Cohen
*Attorney, Agent, or Firm*—Flynn & Frishauf

[57] ABSTRACT

To permit dry operation of a piston within the cylinder, the cylinder is made of metal, and the piston is made of polytetrafluorethylene; the piston, preferably, is formed with an annular ring groove extending downwardly from an end face thereof to leave a circumferential lip, the groove having a spring located therein biasing the lip outwardly against the cylinder wall, to provide for sealing contact of the lip against the cylinder wall, which is additionally reinforced by pressure of the gas being compressed by movement of the piston within the cylinder, tending to expand the lip against the piston surface, at the time when the compression is highest, and sealing is the most desired.

9 Claims, 2 Drawing Figures

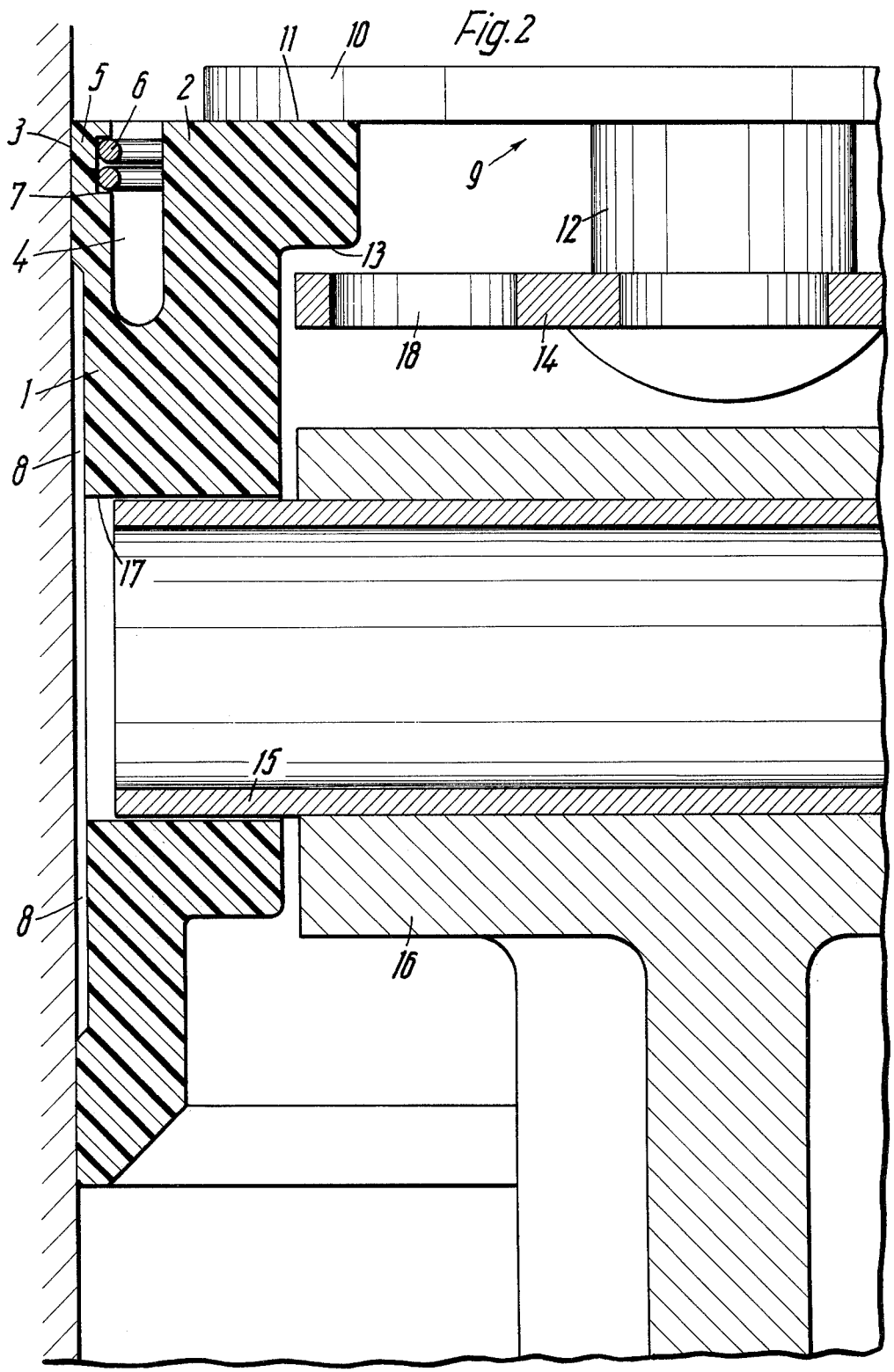

PISTON COMPRESSOR FOR GASEOUS FLUIDS

This is a division of application Ser. No. 433,812, filed Jan. 16, 1974 and now abandoned.

The present invention relates to a cylinder-piston type compressor or pumping apparatus for gasous medium, and particularly to a dry type of apparatus in which no lubricant is supplied to the cylinder and to the piston operating within the cylinder, and particularly to the kind of arrangement in which an axial duct, coupled with a valve, permits flow of gas through the piston when the piston moves in suction direction, and is inhibited from escaping by a valve formed at the end of the piston.

Cylinder-piston type compressors of the type in which a piston is reciprocated within a cylinder, the piston itself being formed with a flap valve or the like have previously been proposed. The piston itself is operated by means of a piston rod, driven from a crank shaft in a conventional manner. Gas to be compressed is supplied to the crank shaft side of the piston, passed through a passage through the piston, and introduced in the space between the piston and the cylinder through a flap valve which, when the piston reverses movement toward the piston head, closes and prevents escape of the gas trapped between the piston and the cylinder head. Such pistons are usually made with piston rings. The piston rings themselves are made of special metals, bronze, steel, or special cast iron alloys. The pistons require lubrication within the cylinder since, otherwise, the piston might freeze within the cylinder. The piston rings are usually formed with slits and have to be accurately manufactured to fit precisely within grooves formed in the piston. Usually, the outer surfaces of the piston rings are polished and lapped in order to provide for proper sealing contact between the piston rings and the inner surface of the cylinder wall.

Piston type compressors of this type, due to the requirement for lubrication, introduce contamination into the gas to be compressed. This contamination may be for example, by oil which is introduced into the compressed gas. In many applications it is undesirable to have even small traces of oil contaminating the compressed gas, for example when used with medical apparatus. Particularly in connection with medical apparatus, compressed gases must be absolutely clean and free of contamination; contaminated compressed gases are also undesired when the gas is used as a pressure source in spray gun applications, particularly for spray painting or spray laquering.

The guide and piston rings, which seal the cylinder wall with respect to a piston, in conventional construction, are slit in order to permit differential expansion and changes in diameter of the piston, with respect to the cylinder wall. The slitting of the piston rings necessarily results in slight leakage losses. Such leakage losses become particularly apparent when the piston-type compressor is made in small demensions, since the relative dimension of the slit becomes greater with respect to the cross-sectional surface of the end face of the piston.

The piston-type compressors of small size and unduly expensive since the requirement for accurate manufacture, and the costs in connection therewith are equally applicable to small apparatus as well as to big ones.

The piston is subject to several requirements: it must have substantial strength, regardless of temperature and particularly at high temperature; it must maintain its shape and outline during operation; it must permit good sealing of the working space, that is the space between the cylinder head and the face of the piston; it must have good running characteristics, that is, sliding and operating characteristics with respect to the cylinder wall, in operation; the frictional forces with respect to the cylinder wall should be small; it should be lightweight, so that the mass to be stopped and reversed in direction is as low as possible; it must be capable of being shaped so that its surface configuration, particularly of the end phase can be matched to design requirements. All these requirements, and further cooling and secure connection of the piston to the usual drive mechanism (piston rods, crank shaft and the like) have previously resulted in constructions in which the material for the piston were selected as a compromise, and, as a consequence, resulted in substantial use of parts and components. Such use of components in connection with the piston (piston rings; special bearings with piston rod and the like) are undesirable particularly, when the construction is to be of minimum size. Upon miniaturization, problems which could readily be solved when the piston had dimensions customarily found, for example, in automotive engines, become additionally aggravated since additional constructional and working steps in connection with the working on the piston, the piston rings, guide rings, bearings and the like become even more complicated, and thus substantially increase costs of piston-cylinder type compressor arrangements.

It is an object of the present invention to provide a piston-cylinder type compressor particularly for gaseous fluids, which can operate dry (that is, without lubrication) which meets the requirements to be placed thereon, and which additionally has an output and use-time which is comperable to known type piston-cylinder compressors.

SUBJECT MATTER OF THE PRESENT INVENTION

Briefly, in accordance with the invention, the piston is made of polytetrafluorethylene.

In accordance with the feature of the invention, the piston is formed in its end face with a ring groove so placed to leave a lip which is spring-biased towards the cylinder wall. This ring-shaped lip, formed by the ring groove in the end face which extends axially, lies radially beyond the center of the piston, and, if the piston expands radially will press against the cylinder wall. The lip is elastically biased against the cylinder wall and therefore the main part of the piston can expand or change its dimensions with respect to the sealing lip. This prevents freezing of the piston within the cylinder, and piston rings, and lubrication between the piston and the cylinder can be omitted. Upon upward motion of the piston in the cylinder towards the cylinder head, the pressure which builds up beneath the cylinder head would have a radial effect, since the gases being compressed will penetrate into the ring groove, and thus, assist the radially outwardly directed by the forces of the spring elements. The sealing of the surface between the sealing lip and the cylinder walls is best just at the time when the piston reaches its upper dead point, that is, when the pressure of gases has its highest level, since at that time the radial pressure of the lip against the cylinder wall will also be highest. Upon downward motion of the piston, and when the pressure is relieved, or when the pressure is low, the sealing force will be less, thus, permitting free movement of the piston within the cylinder.

The invention will be described by way of example with reference to the accompanying drawings, wherein:

FIG. 1 is a longitudinal cross-sectional view of a piston-cylinder type compressor in accordance with the present invention and FIG. 2 is a greatly enlarged sectional view of the portion surrounded by the field A, indicated in dashed lines in FIG. 1.

Piston 1 of the compressor, in accordance with the invention, is a cylindrical body made of polytetrafluorethylene; it is formed at its head 2 with an inlet valve 9. The inlet valve is formed as a valve plate or flap 10, which can lie against the upper face 11 of the piston. A short shaft or pin 12 is connected to an inlet disk 14 (FIG. 2) which may also be formed as a spider or any other element to hold the valve disk 10 in place. The valve disk 10 is made of a corrosion resistant material. Aluminium, brass or zinc are suitable. Disk 14, as seen in FIGS. 1 and 2 is formed with axial openings 18, which can be located at suitable positions, circularly about the center of the pin 12. Axial bores through the piston 1, (not visible in the FIGS.) connect the lower face of the piston with the upper face thereof. Upon movement of the piston downwardly, this disk 14 will seat against a shoulder 13, formed in the interior of the piston 1, due to inertia, and the resulting pressure difference. Shoulder 13 prevents loss and displacement of valve disk 10. The valve disk 10 will, likewise lift off the upper piston face 11, and gases will flow from the crank shaft side of through the bores thereof (not visible) through opening 18 and around the gap between face 11 and the valve disk 10. It will there reach the working or compression space of the cylinder. The disk 10 additionally contributes to radial movement of the air with respect to the piston, particularly in that region of the piston which is subject ot highest heat loading and thus which would require the most cooling. The air being sucked into the upper surface of the piston thus is directed over the very region of the piston which requires cooling, and thus cools this surface.

Upon reversal of direction of movement of the piston as determined, for example, by an electric drive motor, or the like, driving the piston 1 over a crank shaft (indicated schematically in FIG. 1) disk 10 will seat against the upper surface 11 of the polytetrafluorethylene piston. The polytetrafluorethylene piston, due to the characteristics of this material, itself acts as a sealing element and it is thus only necessary to provide for flat machining of the valve disk 10 and for flat forming of the upper side 11 of the piston 1. The surfaces against each other then will be self-sealing. The pressure which acts on the disk 10 additionally provides for sealing pressure of the disk against the piston surface. When the pressure has built up to a certain pre-determined level, a bore 19 (FIG. 1) permits escape of gas against a check valve 20, which is spring biased for the pre-determined pressure. The gas will thus escape over bore 19 and valve 20, to be taken to a supply tank, or other utilization point over a nipple 21, connected to a pressure line or hose. The pressure line then connects to the utilization point, for example, to a paint spray gun, or the like, to be supplied with compressed air, or to any other desired equipment.

As seen in FIGS. 1 and 2, a ring groove 4, extending axially, is formed in the face 11 of the piston spaced by a slight distance from the outer piston wall. This leaves a sealing lip 5 between the groove 4 and the outer edge of the piston. The wall thickness of the sealing lip 5, itself, can be very thin and in miniaturized piston compressors, the wall thickness may be, for example, between 0.4 mm to 1 mm. The inner side of the sealing lip 5 may have an additional recess 7 formed therein, in which a spiral spring 6 is located. As shown, these springs may, for example, be merely a two-turn spiral which presses the sealing lip 5 against the cylinder wall 3. Any other springy or bias element may also be suitable.

The outer surface of the piston 1, as best seen in FIG. 2, is recessed at an axial position which may partly overlap the sealing lip 5, or start lower; the recess 8 provides a zone of the piston of smaller outside diameter than at the upper and lower edge thereof. The lower face of the piston may also be provided with a ring groove and spring, similar to groove 4, spring 6, forming a lip 5, as the upper face thereof. The construction may also be so made that only a single sealing lip, at the lower face of the piston may be used. It is preferred, however, to have the sealing lip and spring biased element located at the head face 11 of the piston, since the requirements with respect to sealing are highest in this region of the piston.

The piston rod 16 has a piston pin or bolt 15 which can directly be fitted in a cross bore 17 formed in the piston 1 and extending radially through the piston. Due to the material selected for the piston, namely polytetrafluoroethylene and due to the small friction in the region of the sealing lips, bearing bushings or special roller or sleeve bearings need not be provided and the piston bolt or piston pin 15 can be directly seated in bore 17. The piston rod 16 is connected, in known and conventional manner, with a crank shaft, which is driven by an electric motor, or some other drive arrangement.

Due to the use of polytetrafluorethylene for the piston, various advantages were obtained:

Sealing lip 5 is resiliently deflectable and will be deflected by spring element 6 to be elastically biased toward the cylinder wall 3, thus providing adequate and substantial sealing between the circumferential surface of the sealing lip 5 and the inner wall of the piston. Upon upward movement of the piston 1, the compressed gas will heat and, additionally, heat the piston head 2. The piston head begins to expand, particularly to expand radially. In known pistons this radial expansion is being compensated by holding the piston diameter slightly smaller than the inner diameter of the cylinder and utilizing slit piston rings, of rather small contact surface to seal the piston against the cylinder wall. The piston rings themselves fit with only a small contact surface against the cylinder walls, and it is thus necessary to form them with perfect surface conditions, that is polished and lapped. The piston in accordance with the present invention, upon radial expansion, can expand in the region of the recess 8; at its upper region, a ring groove 4 accepts the expansion of the piston. This ring groove is only slightly spaced form the outer wall of the piston, and hence the inner wall of the cylinder. The major mass of the piston, therefore, upon thermal loading, can expand radially, and move relatively with respect to the thin walled sealing lip 5. The ring groove 4 will become slightly narrower. Since the spring element 6 is located, in a preferred form, within the groove 7 of the sealing lip 5, the sealing lip will be pressed against the cylinder wall 3 with suitable sealing force. As the piston 1 reaches its upper dead point position, the compression of the gas within the cylinder will likewise increase and this compressive force will be transferred to radial forces acting in the ring groove 4, and further assist the sealing force of the spring 6, pressing the sealing lip 5 against the inner wall of the cylinder. The recess 8, formed in the circumferential surface of the piston permits sealing only by the lip 5 with respect to the cylinder wall, and further determines the surface of the lower piston edge, that is, the location of the lower piston with respect to the cylinder wall. The compressor can, therefore, operate in a metallic cylinder without any lubricant, that is, completely dry, and the air being compressed will likewise be dry.

Due to the selection of the material, preferably metal for the cylinder and polytetrafluorethylene for the piston, danger of freezing of the piston in the cylinder is entirely avoided; any increase in frictional resistance between the cylinder and the piston is compensated by yielding of the tension element 6; upon increased frictional resistance, the spring element 6 can yield radially inwardly.

The particular construction of the piston, as described, is especially useful in small compressors, which operate with working pressures of about 15 bars. The construction is particularly advantageous in smaller compressors since no excessive precision machining of the piston itself is required. Constructing the piston without piston rings, which have to be matched exactly into the piston ring grooves, substantially reduces the overall cost of the compressor.

The valve disk 10 seats against the upper side 11 of the head of the piston 2 when the piston moves upwardly. It therefore seals a flat surface covered by the disk 10 toward the upper side of the piston. The material itself used for the piston, polytetrafluorethylene, has good sealing properties with respect to metal particularly, as well as with respect to other materials, particularly rigid materials, and special seals of a valve disk against the head of the piston itself can be omitted. It is only necessary to flat machine the disk 10, and flat machine or flat form the upper side 11 of the piston 1.

The construction has been described in connection with a piston compressor. The inventive concept can equally well be applied to suction or vacuum pumps, and the actual changes in the piston, if any, are mere matters of design. It is only necessary to provide suitable seals for the crank shaft, where it passes through the crank case, and to provide a connection to a suction line leading to the space below the piston. No essential change is necessary in the piston construction itself. Different types of valves may, of course, be used and the valve construction itself can be changed, as required, without departing from the inventive concept of the piston-cylinder construction.

The spiral spring fitting in groove 4 preferably has two or three turns, although the number of turns, in a specific construction of the spring, as a biasing element, is not critical. Forming the relief 8 in the piston decreases the overall friction between the piston and the cylinder wall, so that the friction of the piston with respect to the contact surfaces with the cylinder wall is restricted to the upper and lower sealing lips, the lower sealing lips preferably extending from a depending portion of the piston which is not solid, as shown in FIG. 2, to permit expansion of the material of the piston, on the one hand, and further permit resilient deflection of the material, as it expands, to prevent freezing of the piston within the cylinder, without lubrication. The spring element tending to press the upper lip 5 against the cylinder wall usually provides sufficient sealing, particularly when the compressed gas within the upper space of the cylinder is permitted to provide radially directed forces to additionally seal the lip against the inner wall, as the piston moves upwardly and the gas is more and more compressed.

Various changes and modifications may be made within the inventive concept.

I claim:

1. A cylinder piston compressor pumping apparatus for gases operating without lubrication between piston and cylinder comprising a metal cylinder providing a cylinder head and formed with an outlet duct opening (19) located essentially centrally thereof;

a one piece piston (1) shaped as a cylindrical body and made of polytetrafluorethylene, and formed with a cross bore (17);

a piston pin (15) rotatably located in said cross bore;

a piston rod (16) connected to said piston pin (15);

the one piece piston being further formed with an annular ring groove (4) extending axially from the end face of the piston which faces the cylinder head and located at a distance from the outer wall of the piston which is small with respect to diameter of the piston to leave a projecting sealing lip (5) between the groove and the outer wall of the piston, said ring groove (4) being open to the cylinder head so that, upon compression of gas within the cylinder head, the compressed gas may penetrate in said groove and force the sealing lip against the inner wall (3) of the cylinder to tight sealing pressure between the outer wall of the piston as formed by said lip and the cylinder, the piston being further formed with an axial passage to permit gas flow therethrough;

spring means (6) located in said groove (4) tending to urge said lip (5) outwardly towards the cylinder wall (3) and in continuous engagement therewith;

a gas flow directing valve disk (10) positioned on the end face of said piston and having an outer diameter slightly smaller than the diameter of the groove in the end face of the piston located adjacent said end face (2) of the piston and in abutting relation therewith and axially movable above said end face to direct air flow from the axial passage of the piston around the disk (10) and towards the region of the sealing lip (5) of the piston (1) before being passed to the central outlet duct opening (19) to cool the sealing lip upon reciprocating movement of the piston in the cylinder and means mounting said gas flow directing disk on said piston permitting said axial movement thereof.

2. Apparatus according to claim 1, wherein the end face (11) of the piston forms a valve seat;

the portion (2) of the piston adjacent the end face is formed with a recess therebelow and a shoulder (13) projecting over the recess;

and said mounting means comprises a valve stem (12) connected to said gas flow directing disk (10) and radially extending means (14) are provided fitting into the recess and beneath said shoulder (13) to hold the flow directing disk (10) in position adjacent the end face while permitting axial movement thereof, so that said flow directing disk (10), by cooperating with said valve seat on the end face (11) will act as a valve to seal the axial passage upon reciprocating movement of the piston.

3. Apparatus according to claim 1 wherein the spring means comprises a spiral spring (6).

4. Apparatus according to claim 1 wherein the sealing lip (5) is formed in its inner surface facing the groove (4) with an annular recess (7) and said spring means (6) is seated in said recess (7).

5. Apparatus according to claim 1 wherein the outer surface of the piston (1) is formed with a cylindrical relief (8) located below the bottom of the annular ring groove (4).

6. Apparatus according to claim 1 wherein the flow directing disk (10) is of corrosion resistant metal.

7. Apparatus according to claim 1, wherein the sealing lip (5) is formed in its inner surface facing the groove (4) with an annular recess (7), and said spring means (6) is a spiral spring seated in said recess (7).

8. Apparatus according to claim 7, wherein the outer surface of the piston (1) is formed with a cylindrical relief (8) located below the bottom of the annular ring groove (4).

9. Apparatus according to claim 8, wherein the flow directing disk (10) is of corrosion resistant metal.

* * * * *